(12) United States Patent
Mason

(10) Patent No.: US 8,355,948 B2
(45) Date of Patent: Jan. 15, 2013

(54) SYSTEM AND METHODS FOR DISCOUNT RETAILING

(75) Inventor: Andrew Mason, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 215 days.

(21) Appl. No.: 12/776,028

(22) Filed: May 7, 2010

(65) Prior Publication Data

US 2010/0287103 A1    Nov. 11, 2010

Related U.S. Application Data

(63) Continuation-in-part of application No. 12/592,947, filed on Dec. 4, 2009.

(60) Provisional application No. 61/215,453, filed on May 5, 2009.

(51) Int. Cl.
*G06Q 30/00* (2012.01)
(52) U.S. Cl. .................................................. 705/14.1
(58) Field of Classification Search .................. 705/14.1
See application file for complete search history.

(56) References Cited

U.S. PATENT DOCUMENTS

| | | | |
|---|---|---|---|
| 5,715,445 A | 2/1998 | Wolfe | |
| 5,870,770 A | 2/1999 | Wolfe | |
| 5,946,682 A | 8/1999 | Wolfe | |
| 5,970,470 A | 10/1999 | Walker et al. | |
| 6,006,252 A | 12/1999 | Wolfe | |
| 6,049,778 A | 4/2000 | Walker et al. | |
| 6,101,484 A | 8/2000 | Halbert et al. | |
| 6,128,599 A | 10/2000 | Walker et al. | |
| 6,151,603 A | 11/2000 | Wolfe | |
| 6,154,172 A | 11/2000 | Piccionelli et al. | |
| 6,249,772 B1 | 6/2001 | Walker et al. | |
| 6,263,351 B1 | 7/2001 | Wolfe | |
| 6,269,343 B1 | 7/2001 | Pallakoff | |
| 6,292,813 B1 | 9/2001 | Wolfe | |
| 6,301,576 B1 | 10/2001 | Wolfe | |
| 6,327,573 B1 | 12/2001 | Walker et al. | |
| 6,336,131 B1 | 1/2002 | Wolfe | |

(Continued)

FOREIGN PATENT DOCUMENTS

WO    WO 00/79456 A2    12/2000

(Continued)

OTHER PUBLICATIONS

U.S. Appl. No. 6,047,266, filed Apr. 4, 2000, Van Horn et al.

(Continued)

*Primary Examiner* — Daniel Lastra
(74) *Attorney, Agent, or Firm* — Brinks Hofer Gilson & Lione; Amir N. Penn

(57) ABSTRACT

A system and methods to mutually satisfy a consumer with a discount and a vendor with a minimum number of sales by establishing a tipping point associated with an offer for a good or service. If the tipping point is met, the sale of the good or service is executed and the consumer is charged and receives an indication of the discounted sale, such as a certificate. If the tipping point is not met, the discount offer is abandoned and the consumer is not charged. Once the tipping point is established, the vendor receives a payment, even before the consumer uses the certificate. The system and methods also include a reward or loyalty program, an exchange or secondary market for the purchased deals, and a matching algorithm that matches customers to relevant goods or services.

23 Claims, 6 Drawing Sheets

U.S. PATENT DOCUMENTS

| | | |
|---|---|---|
| 6,341,305 B2 | 1/2002 | Wolfe |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van Horn et al. |
| 6,604,103 B1 | 8/2003 | Wolfe |
| 6,631,356 B1 | 10/2003 | Van Horn et al. |
| 6,754,636 B1 | 6/2004 | Walker et al. |
| 6,778,837 B2 | 8/2004 | Bade et al. |
| 6,836,476 B1 | 12/2004 | Dunn et al. |
| 6,876,983 B1 | 4/2005 | Goddard |
| 6,918,039 B1 | 7/2005 | Hind et al. |
| 6,928,416 B1 | 8/2005 | Bertash |
| 6,931,130 B1 | 8/2005 | Kraft, IV et al. |
| 6,934,690 B1 | 8/2005 | Van Horn et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis, II et al. |
| 7,039,603 B2 | 5/2006 | Walker et al. |
| 7,043,526 B1 | 5/2006 | Wolfe |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van Horn et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van Horn et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van Horn et al. |
| 7,376,580 B1 | 5/2008 | Walker et al. |
| 7,406,332 B1 | 7/2008 | Gaillard et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van Horn et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,672,897 B2 | 3/2010 | Chung et al. |
| 7,689,468 B2 | 3/2010 | Walker et al. |
| 7,689,469 B1 | 3/2010 | Mesaros |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,150,735 B2 | 4/2012 | Walker et al. |
| 2002/0023010 A1 | 2/2002 | Rittmaster et al. |
| 2002/0065713 A1 | 5/2002 | Awada et al. |
| 2002/0103746 A1 | 8/2002 | Moffett, Jr. |
| 2002/0188511 A1* | 12/2002 | Johnson et al. .................. 705/14 |
| 2003/0004802 A1 | 1/2003 | Callegari |
| 2003/0018559 A1 | 1/2003 | Chung et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1* | 9/2004 | Boyd et al. ...................... 705/14 |
| 2004/0243478 A1 | 12/2004 | Walker et al. |
| 2005/0075945 A1 | 4/2005 | Hodge et al. |
| 2005/0102156 A1 | 5/2005 | Linduff |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061220 A1 | 3/2007 | Vaid |
| 2007/0150354 A1 | 6/2007 | Walker et al. |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0027810 A1 | 1/2008 | Lerner et al. |
| 2008/0052186 A1 | 2/2008 | Walker et al. |
| 2008/0052189 A1 | 2/2008 | Walker et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0242514 A1 | 10/2008 | Piccionelli et al. |
| 2009/0024484 A1 | 1/2009 | Walker et al. |
| 2009/0030776 A1* | 1/2009 | Walker et al. ................... 705/10 |
| 2009/0125414 A1 | 5/2009 | Kleinrock et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0076832 A1 | 3/2010 | Cha |
| 2010/0114132 A1 | 5/2010 | Piccionelli et al. |
| 2010/0146604 A1 | 6/2010 | Piccionelli |
| 2011/0054996 A1 | 3/2011 | Spector |
| 2011/0099082 A1 | 4/2011 | Walker et al. |
| 2011/0231321 A1 | 9/2011 | Milne |
| 2012/0054031 A9 | 3/2012 | Walker et al. |

FOREIGN PATENT DOCUMENTS

| WO | WO 00/79495 A2 | 12/2000 |
| WO | WO 01/08024 A2 | 2/2001 |
| WO | WO 01/11483 A2 | 2/2001 |
| WO | WO 01/50301 A2 | 7/2001 |
| WO | WO2009094382 A2 | 7/2009 |

OTHER PUBLICATIONS

Emily S. Rueb, "Group Buying, Better Together"; The New York Times City Room Blog, Feb. 16, 2010.

Robert J. Kauffman and Bin Wang, "Bid Together, Buy Together: On the Efficacy of Group-Buying Business Models in Internet-Based Selling"; "The (R)evolution Goes Mobile", 5th Annual University of Minnesota Electronic Commerce Conference, Mar. 27-28, 2001, Carlson School of Management, University of Minnesota, Minneapolis Minnesota.

Krishnan S. Anand and Ravi Aron (OPIM Department, The Wharton School, University of Pennsylvania), "Group Buying on the Web: A Comparison of Price Discovery Mechanisms", Management Science, vol. 49, No. 11, pp. 1546-1562, Nov. 2003.

Editor, "Technology Drives ActBig 'Next Generation' GroupBuying Application", Market Wire, Feb. 29, 2005.

Staff, "ActBig.com muscles in on group buying power", RedHerring.com, Oct. 13, 1999.

Charles Bermant, "ActBig: Save Big", Internetnews.com, Nov. 16, 1999.

Alan S. Davis "Group Buying on the Internet", Seminar Presentation Slides, University of Minnesota, MIS Research Center, Mar. 10, 2006.

Office Action issued in corresponding U.S. Appl. No. 12/592,947, dated Dec. 16, 2011, 9 pgs.

* cited by examiner

GROUPON
Collective Buying Power | Visit More Cities △ Never Miss A Groupon △ Refer Friends, Get $XX    Contact Us Today's Deal   Recent Deals   How Groupon Works   Discussion | (beta) Rewards | | Hi Suzy Q | 🔍 | My Stuff
                                                                                    500 Gs

| 500 Gs    | 3           |
| To Spend  | Experiences |

△ 2 more Experiences to get to Silver!!!

Suzy Q.
My Activities

Discover Great Things

Members Only. Shop with Gs and/or Credit Card.
Showing rewards near 1000 Test Street, Testville, IL
Want to use your Gs in another location? Change Address Bronze Level
10% Off < 1, 2, 3, 4, 5 > | View All 07:08:04 Time Left | 8 Left
Basic Mani-Pedi
Pinky's Salon
Retail Price           $50
My Price: as low as $40.00
(up to 20% off at Bronze level)

47:24:07 Time Left | Limited
Item Name Lorem Ipsum
Merchant Name
Retail Price           $50
My Price: as low as $40.00
(up to 20% off at Bronze level)

47:24:07 Time Left | Limited Q
Item Name Lorem Ipsum
Merchant Name
Retail Price           $50
My Price: as low as $40.00
(up to 20% off at Bronze level)

03:24:07 Time Left | 12 Left
Item Name Lorem Ipsum
Pinky's Salon
Retail Price           $50
My Price: as low as $40.00
(up to 20% off at Bronze level)

Item Name Lorem Ipsum
Merchant Name
Retail Price           $50
My Price: as low as $40.00
(up to 20% off at Bronze level)

Item Name Lorem Ipsum
Merchant Name
Retail Price           $50
My Price: as low as $40.00
(up to 20% off at Bronze level)

FIG. 5

| My Stuff | My Groupons (5) | My Gifts (2) | My Gs (500) | My Account |

My Total to date: 500 Gs
<< shop rewards

My Activities                           Show me Gs   Earned   Used   Awarded   All

| Earned: 20 Gs | Lorem ipsum dolor. | 1 week ago |
| Earned: 20 Gs | Bought (1) $20 Burgtime Groupon, Valued at $40. | 1 week ago |
| Earned: 250 Gs | Bought (1) $50 Spa Groupon, Valued at $100. | 2 weeks ago |
| Earned: 20 Gs | Tipped $50 Spa Groupon. Earned Tipper Badge. | 2 weeks ago |
| Earned: 37 Gs | Promoted Groupon on Facebook Wall Status. | 2 weeks ago |
| Earned: 50 Gs | Referred Jane Smithe to Groupon via Facebook. | 2 months ago |
| Earned: 100 Gs | Joined via Facebook Connect. | 3 months ago |
| Earned: 37 Gs | Lorem ipsum dolor. | 2 weeks ago |
| Earned: 50 Gs | Lorem ipsum dolor. | 2 months ago |
| Earned: 100 Gs | Lorem ipsum dolor. | 3 months ago |
| Earned: 100 Gs | Lorem ipsum dolor. | 3 months ago |

| Shop Promo | Learn How to Earn More Gs Promo | We Want Your Feedback Tell Us What You Think |

FIG. 6

SYSTEM AND METHODS FOR DISCOUNT RETAILING

PRIORITY STATEMENT

This application is a continuation-in-part of co-pending U.S. patent application Ser. No. 12/592,947 filed Dec. 4, 2009, entitled SYSTEM AND METHODS FOR DISCOUNT RETAILING, which was a regular filing of provisional application Ser. No. 61/215,453 filed May 5, 2009.

FIELD OF THE INVENTION

This invention relates generally to the offer and sale of goods and services, and more specifically to a system and methods for offering goods and services of others at a discount on a network such as the Internet, wherein the sale of the goods and services is contingent upon a certain number of actual sales, i.e., a tipping point, where the merchant ultimately providing the goods or services does not pay the out-of-pocket expenses for advertising and marketing the goods or services, and receives the revenue generated from the sales of the discounted goods or services before actually providing those goods or services. Once the customer accepts an offer, payment information for that offer is exchanged, but no payment is actually made. If and when the required number of offers are accepted, i.e., the tipping point, payment based on the payment information is completed.

The present invention contemplates a reward or loyalty program used in conjunction with the discount retailing system described herein. In the incentive or loyalty program, consumers are encouraged to collect points, which can then be redeemed for awards. Among other ways loyalty points can be collected, they can be based on the price of a discount offer that a consumer purchases, for the purchase of certain goods or services, the first time a purchase is made and for other reasons.

The present invention contemplates an exchange program in which customers that have already purchased deals (or have collected loyalty points), can exchange those deals for money, loyalty or rewards points or other deals. Accordingly, the exchange or exchange program allows members or groups of members to offer to sell or exchange their deals for money or other deals. Anything of value, including loyalty or reward points can be exchanged. In order to accommodate the purchase, sale or exchange of deals, the present invention contemplates an exchange where customers or members can list the deals they intend to sell (or buy) and other customers or members can make offers for the deals. The exchange system can check to make sure those selling or purchasing the deals have the right to make such a sale or purchase. Further, the system can keep track of the transfer of ownership of the deal for validating deals and other reasons. In an alternative embodiment, instead of offering the deals at the exchange for a specific amount, the potential purchasers can bid on the deals to obtain the maximum amount (less than the full price) for the deal.

The present invention contemplates matching customers to relevant goods or services in conjunction with the discount retailing system described herein. By obtaining information about or from customers, including their general demographic information, likes and dislikes, price range they are willing to spend, previous deals they enjoyed or did not enjoy, etc. offers can be made that are more relevant or pertinent to that particular customer and thus have a better chance of being accepted.

Information about the customer can be obtained in numerous ways, including a customer profile that is set up by the customer or those that know the customer, culled from previous deals that the customer accepted, from the customer's ratings of those deals, customer questionnaires or surveys, a database about the customers that was created from one or more of the above, or created elsewhere altogether. Once information about a particular customer is known, the deals that are forwarded to that customer can be more relevant and more likely accepted.

Further, planning tools can be used to incorporate variables or restraints thereby limiting or expanding the number of customers to which a deal may be offered for various business reasons, such as no fewer than X customers or no greater than Y customers will be offered a particular deal. By optimizing each deal across all customers or a group of customers, these constraints can be used to attain the particular business goals.

BACKGROUND OF THE INVENTION

Retailing is the exchange—sale and purchase—of goods and services between a vendor or merchant and a consumer or customer. Typically, negotiation is absent between the vendor and consumer with respect to the terms of a sale or purchase of a good or service. Retailing characteristically employs a vendor-controlled format whereby the vendor determines which goods or services to offer for sale, when the goods or services will be offered for sale, and the non-negotiable fixed price at which the good or service will be sold.

Discounts are an integral part of retail strategies for many goods and services. Vendors rely upon discounts for a variety of reasons, such as to promote new and existing goods and services and to increase the sales of that particular item or service, or to increase the sales of the merchant's other goods and services. Further, consumers rely upon discounts as a way to reduce their costs.

Discount techniques include providing coupons and rebates to potential customers, but these techniques have several disadvantages, such as a historically small percentage of consumer participation and fraud. Since the participation level is so small, merchants are forced to canvass an area to attract the correct demographic of potential customers for its products or services. Most of the coupons or rebates (or the advertisements containing the coupons or rebates) end up with consumers that do not need or want the goods or services.

Further, fraud is an increasing problem in that coupons may be copied, or rebates may be used to obtain cash back for goods and services that the fraudulent consumer never actually purchased.

Coupons and rebates are typically distributed using direct mail, newspaper print, and magazines and have associated with them a low percentage of users of those actually receiving the coupons. Besides not being environmentally friendly due to paper waste, coupons and rebates may not be cost effective.

Further, advertising and marketing associated with coupons and rebates can be expensive when done through radio or television medium, and extremely ineffective when done through print advertisements. Regardless of the advertising medium however, there is very little reason for the consumer to pass along the advertisement or coupon to others, so that a merchant must advertise or market the discount to each individual.

A vendor offers coupons or rebates in the hopes of securing future sales at full retail prices, repeat sales and ultimately an increase in overall sales. Ultimately, vendors cannot offer goods and services at a discount unless the vendor can ensure a minimum number of sales to justify the discount.

Discounting techniques also include pricing curve group discount models, but traditional pricing curve group discount models confuse consumers and leave them feeling like they did not get the best possible deal.

There is currently no system and methods to mutually satisfy the consumer with a discount and the vendor with a minimum number of sales, while at the same time providing the merchant with expense-free advertising and marketing for the goods or services. There is also no system or methods that utilize the strength of a social network to distribute information about the discounts, and create an incentive for the customer to distribute the information about the discount.

There is also no current system that pays the merchant for the sale of the discounted items sold up front, prior to the merchant having to provide the goods or services to the customer that has paid for those goods or services. The present invention satisfies these needs.

SUMMARY OF THE INVENTION

The present invention is a system and methods to mutually satisfy the consumer with a discount for the purchase of goods or services on the one hand, and the vendor with a minimum number of sales at that discounted price. The minimum number of sales of the goods or services is also known as the tipping point.

The present invention also provides a merchant with inexpensive or free advertising and marketing of the particular goods or services being offered for sale, utilizing the strength of a social network, along with a guarantee that the sale price will only have to be honored if a minimum number of customers not only accept the offer, but also pay the discounted price in advance, for the goods or services. Accordingly, a merchant can provide a greater or deeper discount knowing that at least a certain number of sales will occur at that discount.

Since, in accordance with the present invention, the sales are made at the time that the consumer decides to accept the offer, even before taking possession of the goods or receiving the services, and only if the minimum number of sales are attained, the money from the sales can be immediately (or soon thereafter) provided to the merchant, thereby providing the merchant with the revenue from the sale of the goods or services in advance of the merchant providing the goods or services to the customer.

The sale price may remain available for a limited time, for example, twelve hours or one day, or until the number of sales equals or exceeds the minimum or tipping point by a given amount. For example, the tipping point may be reached when 100 individuals accept an offer to purchase a discounted sandwich, and the offer ends when 200 individuals accept the offer to purchase the discounted sandwich.

Further, the discount available may be modified as the number of actual customers increase. For example, the first 25 customers to purchase an item may receive a 50% discount, while the next 25 customers for that same item receive a 40% discount, and so on. By creating these limitations on the discounts as the number of deals are accepted (and purchased); there is incentive for consumers to watch the deals carefully to be able to react quickly.

According to the present invention, a merchant or vendor is selected for participation in discount retailing. The merchant may request to have its goods or services offered, or the company providing the services can solicit merchants to become part of the system. The vendor may be any individual or company that provides goods or services to a consumer, and may be local, national or global. The merchant's goods or services are identified for a discount offering and a minimum number of accepted deals, or the tipping point, is determined. The tipping point is defined as the minimum quantity of the particular goods or services to be accepted by the consumers, or the critical mass, in order to execute the sale of the goods or services. Typically, the vendor sets the tipping point.

Next, terms of the offer are determined and may include a discount or varying discounts to be provided, duration of the offer, maximum number, if any, of the goods or services the vendor is willing to offer for sale, expiration of the goods or services, or any other restrictions or limitation associated with the offer.

The discount offer is then exploited, either through a global communication network, such as the Internet, or through some other vehicle that will be accessible to consumers, such as an Intranet, email or another communication network. If the Internet is used, a website can be generated and updated with the offer such that consumers can accept the offer. Consumers can "sign up" for offers on the website and even to receive updates as they occur. "Signing up" may entail providing one or more of the following types of information: the name of the consumer, address of the consumer, email address, and a form of payment to purchase the discount offer, such as a credit card or debit card. Although signing up is not necessary to participate in the offers (one can accept an offer and provide payment information each time), by signing up, the consumer can more easily and more quickly take advantage of any offer.

Consumer participation is received in the way of accepted offers, and calculated in terms of the number of consumers that accepted the discount offer. If the number of consumers that participated by accepting the discount offer equals or exceeds the tipping point, then the offer of the sale of the good or service becomes valid or legitimate, and each customer that has accepted the offer is charged using their method of payment, i.e., credit card, debit card, Paypal®, or in other ways utilizing a method of payment. The customer is then provided with a receipt of purchase, such as an email, coupon, gift certificate, etc. that can be printed out for redemption (or used as a receipt on a cell phone, etc.).

At this time (or shortly thereafter), the merchant receives a payment based on the previous agreement for a portion of the sale of the discounted goods or services, after taking out the cost charged by the owner of the system or platform.

The consumer can then take the printed receipt of purchase (or other indication of purchase) to the merchant, who will provide the goods or services purchased at the reduced price. Alternatively, the list of customers that accepted the (now valid) offer and purchased the discounted goods or services can be forwarded to the merchant for providing the goods or services. These two methods for validate the purchase can also be used in combination.

Conversely, if the number of customers that participated by accepting the discount offer does not reach the tipping point in the allotted time, then the offer is rescinded or rejected, the consumer is not charged for the purchase, and the merchant does not receive a payment (or have to provide the goods or services).

Customers can also sign up to receive an email when the deal is announced, and can access the system through one of the many social networking website systems, such as Facebook or Twitter. Further, customers can set up an account for purchasing the deals and receive credits or money toward future deals by referring other customers to sign up and purchase a deal.

In an alternative embodiment of the present invention, an incentive program or loyalty program is contemplated. The incentive program promotes or encourages specific actions or behavior of customers or consumers. According to the present invention, consumers collect and redeem points. Points are redeemed for one or more awards, such as goods services or other deals. It is contemplated that an award may be monetary or non-monetary.

For purposes of this application, the loyalty or reward points termed herein as G-Points or simply Gs and are points collected which can be based on a number of items, such as the price of a discount offer that a consumer purchases, and the points termed herein as "Experience Points" or simply "Experiences" are points collected based on use of the discount offer after purchase.

It is contemplated that Gs and Experiences may be collected for a variety of reasons such as repeat customer purchases of the discount offer, the purchase of a certain good or service, the first time a purchase is made from a certain merchant or vendor, trying a new good or service for the first time, number of purchases of the discount offer over time, number of visits to the website on the Internet providing the discount offer, the number of visits to the vendor to fulfill the discount offer, a purchase that matches the tipping point or a purchase that exceeds the tipping point. There is no limit to the ways that a customer uses to collect reward points or Gs. Other examples of rewardable actions include marketing, advertising, or sharing deals with others through various communication means, social networks or websites, such as email, Facebook, Twitter, etc.

Further, customers can be rewarded for other actions taken or even randomly, either periodically or from time to time. Top point earners (daily, monthly, annually, or cumulative) can be awarded additional points or prizes, such as parties, etc. Each city or local region may have an award for point totals, etc. Also, Gs or points may be awarded for reaching certain milestones, such as purchasing a certain number of deals within a set time frame. As an example, if a customer purchases five deals in a one month timeframe, that customer may receive 1000 reward points. Numerous award levels and milestones can be used.

It is also contemplated that various terms of the points can be defined such as expiration and award. It is contemplated the points may either expire within a certain time frame or are good until redeemed. The award may be ether monetary or non-monetary and the award further includes customized levels at which points can be collected as well as customized levels at which points can be redeemed. For example, one point can be collected for every dollar spent. As another example, 50 points can be redeemed for a value of ten dollars or for 10% off. In one embodiment, points can be redeemed at an Internet store such as a merchant or vendor that only accepts points in exchange for a good or service. Points or Gs can also be redeemed on the featured deal that day or in a secondary marketplace that features recent or past merchants for the deal of the day. There is no limitation as to how a customer that has collected or obtained Gs or points can redeem those points.

In another embodiment of the present invention, the system and methods of the present invention include an exchange program in which customers that have already accepted an offer that has "tipped" or purchased deals, can exchange those deals for money, loyalty or rewards points (as described herein) or other deals. Accordingly, the exchange or exchange program allows members or groups of members to offer to sell or exchange their deals for money or other deals. As an example, if a customer has paid $25 for a deal for $50 off at a Chinese restaurant and that customer no longer plans to use that deal, the customer can sell the deal for $20, such that the individual purchasing the deal pays $20 and gets $50 off of the meal. Otherwise, the two can exchange deals so that one party receives a $50 deal at the Chinese restaurant and the other party receives a $50 deal for a massage. Anything of value, including loyalty or reward points can be exchanged.

To accommodate the purchase, sale or exchange of deals, the present invention contemplates an exchange where customers or members can list the deals they intend to sell (or buy) and other customers or members can make offers for the deals. As another example, a member that is about to have a $40 manicure looks to the exchange to see if there are any deals for sale. Even if there is a deal for $30 (that originally was purchased for $20), it is less than paying the full amount for the manicure.

In an alternative embodiment, instead of offering the deals at the exchange for a specific amount, the potential purchasers can bid on the deals to obtain the maximum amount either less or more than the full price for the deal, depending on market conditions. Further, to provide a validation and accounting system, the present invention can track the purchase, sale and/or transfer of deals to record the new owner of the particular deal transferred.

In another embodiment, the present invention contemplates matching customers to relevant goods or services in conjunction with the discount retailing system described herein. By obtaining information about or from customers, including their demographic profile, likes and dislikes, price range they are willing to spend, previous deals they enjoyed or did not enjoy, etc. offers can be made that are more relevant or pertinent to that particular customer and thus have a better chance of being accepted.

Information about the customer can be obtained in numerous ways, including a customer profile that is set up by the customer or those that know the customer, culled from previous deals that the customer accepted, from the customer's ratings of those deals, customer questionnaires or surveys, a database about the customers that was created from one or more of the above, or created elsewhere altogether. Once information about a particular customer is known, the deals that are forwarded to that customer can be more relevant to that customer and therefore more likely accepted.

Further, the present invention contemplates better targeting of deals to customers and may offer one deal to a group of customers one day and a different deal to a different group of customers that same day. Also, based on information about the customers, the present invention contemplates offering a particular deal to one group of customers one day and the same deal to a different group of customers a different day. As such, offering the same deal to different customers on different days allows the demand to be properly managed for the benefit of the merchant, which also reduces or avoids a poor user experience. For example, the experience of a customer being prevented from getting a reservation to a restaurant due to overwhelming demand from other customers.

Numerous deals may be offered to different or multiple groups at the same or different times. The present invention contemplates that based on historical action and certain customer's responses to an offer, additional customers may be given the same offer. For example, if a group of customers is generated based on historical actions, and that group tends to accept offers similar to another group of customers (the second group being generated based on ratings of various deals), then if the first group accepts an offer by a certain percent (for example 10%), then the same offer should be made to the second group.

There is no limitation on the number of groups or even if certain customers overlap into multiple groups (as long as they do not continue to receive the same offer multiple times; unless that is their preference). A computer program or algorithm using various filters and subroutines can keep track of the customer groups and which customers have received which offers. In this manner, a test group (or multiple test groups) can be generated and receive an offer. If the test group accepts the offer in certain quantities, the offer is made to some or all of the other groups (or to everyone). If the test group does not respond favorably by accepting the offer, the offer may be dropped altogether.

An object of the present invention is to provide consumers with a discount on goods and services, while providing the merchant inexpensive or free advertising and marketing for those goods or services.

Another object of the present invention is to provide a guaranteed minimum number of sales of a particular item or service, otherwise no sale at that discounted price occurs— the sale only occurs if a minimum number of customers accept the deal.

Another object of the present invention is for the vendor to gain exposure to a new audience and create an incentive for the customer to, market the deal to other customers, and to provide a vehicle, such as a website on the Internet, in which large numbers of consumers return to that particular vehicle to find out about new deals.

Another object of the present invention is to provide the merchant with revenue from the sales (if the minimum is attained and the offer becomes valid) prior to delivering the goods or providing the services to the customer.

Another object of the present invention is to provide a system and methods for increasing sales, and advertising and marketing the merchant's goods or services.

Another object of the present invention is to provide an incentive or loyalty program to promote or encourage specific actions or behavior of the customers in order to collect and/or redeem points for monetary or non-monetary awards.

Another object of the present invention is to provide a system and methods for matching customers to relevant goods or services by obtaining information about customers and matching those customers to offers that are more relevant or pertinent to that particular customer and thus have a better chance of being accepted. This embodiment provides a more improved experience for the customer and an improved quality of customer being referred to the merchant, which is necessary for repeat business and greater profitability.

Another object of the present invention is to provide a system and methods for an exchange program in which customers that have already purchased deals, can exchange those deals for money, loyalty or rewards points or other deals from other customers. The exchange or exchange program allows members or groups of members to participate in offers that have already ended, and to trade or sell offers that members will not be able to redeem. This maximizes the customers' use of a particular deal, and increases customer satisfaction.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings provided to illustrate and not to the limit the invention, where like designations denote like elements, and in which:

FIG. 5 illustrates one embodiment of an on-line G-store where G-Points can be redeemed according to the present invention; and FIG. 6 illustrates a personal account summary of the incentive program in accordance with one embodiment of the present invention.

DETAILED DESCRIPTION OF THE PREFERRED EMBODIMENT

Figure 1:
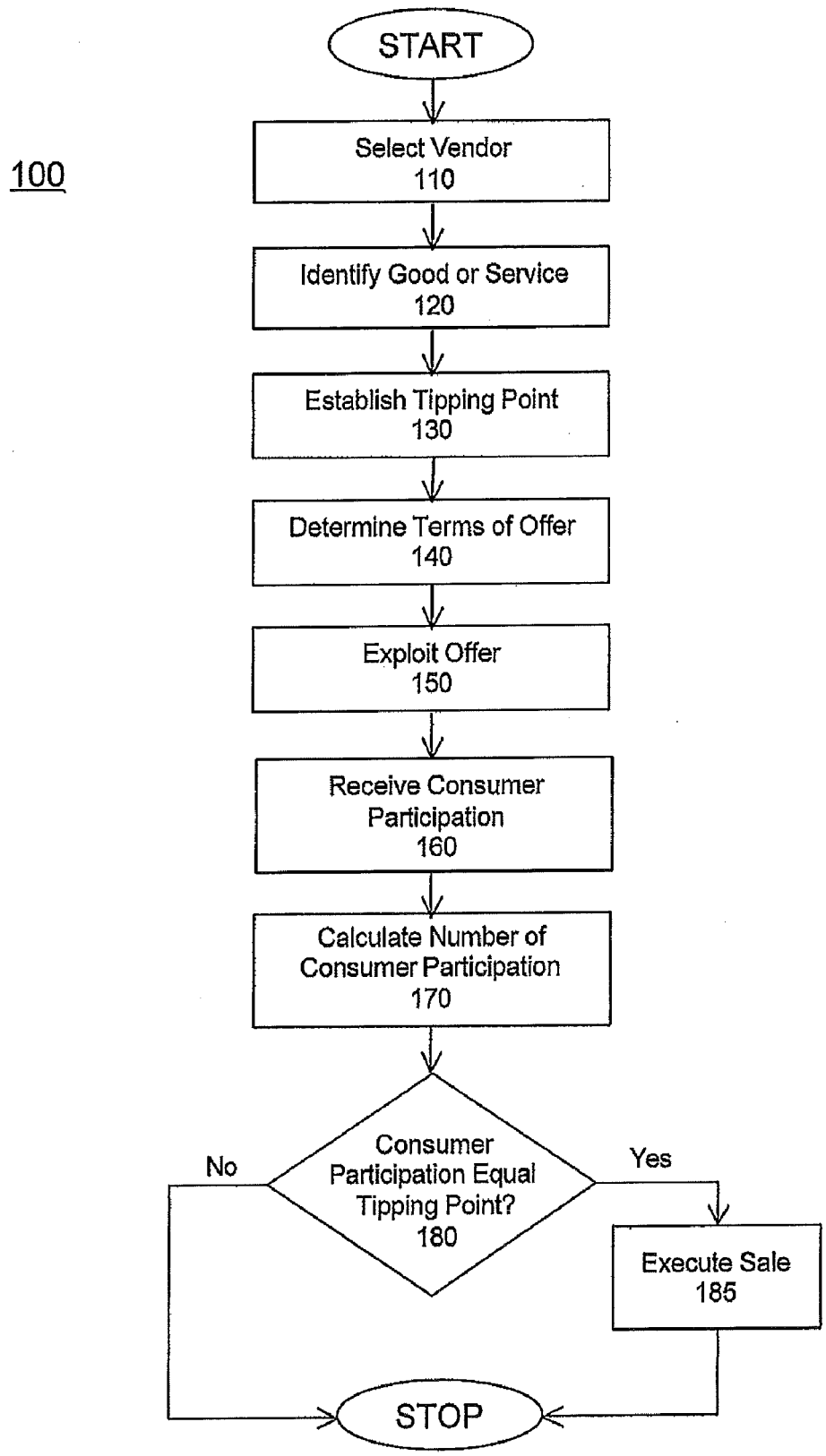
FIG. 1 illustrates a flow chart in accordance with one embodiment of the present invention.

FIG. 1 illustrates a flow chart 100 in accordance with one embodiment of the present invention. As shown in FIG. 1, a vendor is selected at step 110 for participation in the present invention. The vendor may be any individual or entity that provides goods or services to a consumer. The vendor may be local, national or global in terms of the geography the vendor provides products or services, and the vendor may be solicited for the system or may hear of the system and may approach the system's provider without being solicited. Additionally, a product or service provided by the vendor is identified for a discount offering at step 120. The good may be any product sold or distributed by the vendor, and the service likewise, can be any service provided by the vendor.

A tipping point is then determined at step 130. Again, the tipping point is defined as the minimum quantity of the good or service to be accepted by consumers in order to execute the sale of the good or service. Typically, the vendor sets the tipping point. At step 140, terms of the discount offer are determined and include discount to be provided, duration of the offer, for example 24 hours, and maximum number, if any, of the good or service the vendor is willing to offer, expiration of the good or service, or restrictions associated with the good or service.

At step 150 the discount offer is exploited through a website on the Internet. Consumers participate by accepting the offer such as by "signing up" for the offer on the website. "Signing up" may entail providing the name of the consumer; address of the consumer, and form of payment to purchase the offer. At step 160, the consumer participation is received and calculated in terms of the number of consumers that participated by accepting the discount offer at step 170. As shown by step 180 in FIG. 1, if the number of consumers that participated by accepting the discount offer equals the tipping point established at step 130, the sale of the good or service is executed at step 185. If the number of consumers that participated by accepting the discount offer does not equal the tipping point established at step 130, the offer is abandoned. The sale of the good or service is executed by providing the consumer with a gift certificate.

The following is discussed with reference to a restaurant discount of 50%, but is merely exemplary. The present invention is applicable to a variety of goods, services and discounts.

Vendor XYZ Restaurant is selected to participate in discount retailing according to the present invention. XYZ Restaurant serves Chicago, Ill. and the Chicagoland area. The tipping point is established at 25, which is the critical mass or minimum quantity that must be accepted by consumers in order to execute the sale of the offer. So, if 24 people accept the discount offer then the offer is abandoned and no consumer receives the discount.

Next, terms of the discount offer are determined. The discount to be provided by XYZ Restaurant is $20 in food for the cost of $10, provided the tipping point of 25 is met. Another term is that the offer will run for 8 hours, although any duration is contemplated. Another term may be that XYZ Restaurant will only provide a maximum of 100 discount offers, although any variation is contemplated, for example, terms of the discount offer could vary with respect to the number of consumers that accept the offer in excess of the tipping point. For example, the first 25 consumers that accept the discount offer receive the 50% discount. The subsequent consumers (number 26 through 50) to accept the offer receive a 40% discount, or $20 in food for the cost of $12. The next subsequent consumers (number 51 through 100) to accept the offer receive a 20% discount, or $20 in food for the cost of $16.

Another term may be that, provided the tipping point is met, the consumer must use the discount offer within two months otherwise it expires. Any expiration date is contemplated including no expiration. Yet another term may be that the discount is applicable to food only, not beverages, but again, any restriction is contemplated such as the discount only applies to alcoholic beverages.

Upon establishing the tipping point and determining the terms, the discount offer is exploited through a website on the Internet. Consumers accept the offer via the website and provide their name, address and credit card number. Upon or before the 8 hour duration ends, consumer participation is received by the system and the number of consumers that accepted the discount offer is calculated. In this example, 50 people accepted the offer, which meets and exceeds the tipping point of 25. Therefore, the discount offer is realized and the sale of the service is executed. Each consumer's credit card is charged $10 and the consumer receives a $20 gift certificate to XYZ Restaurant. Again, if the number of consumers that accepted the discount offer is calculated at any number less than 25, the discount offer is abandoned and the consumer's credit card is not charged.

Figure 4:
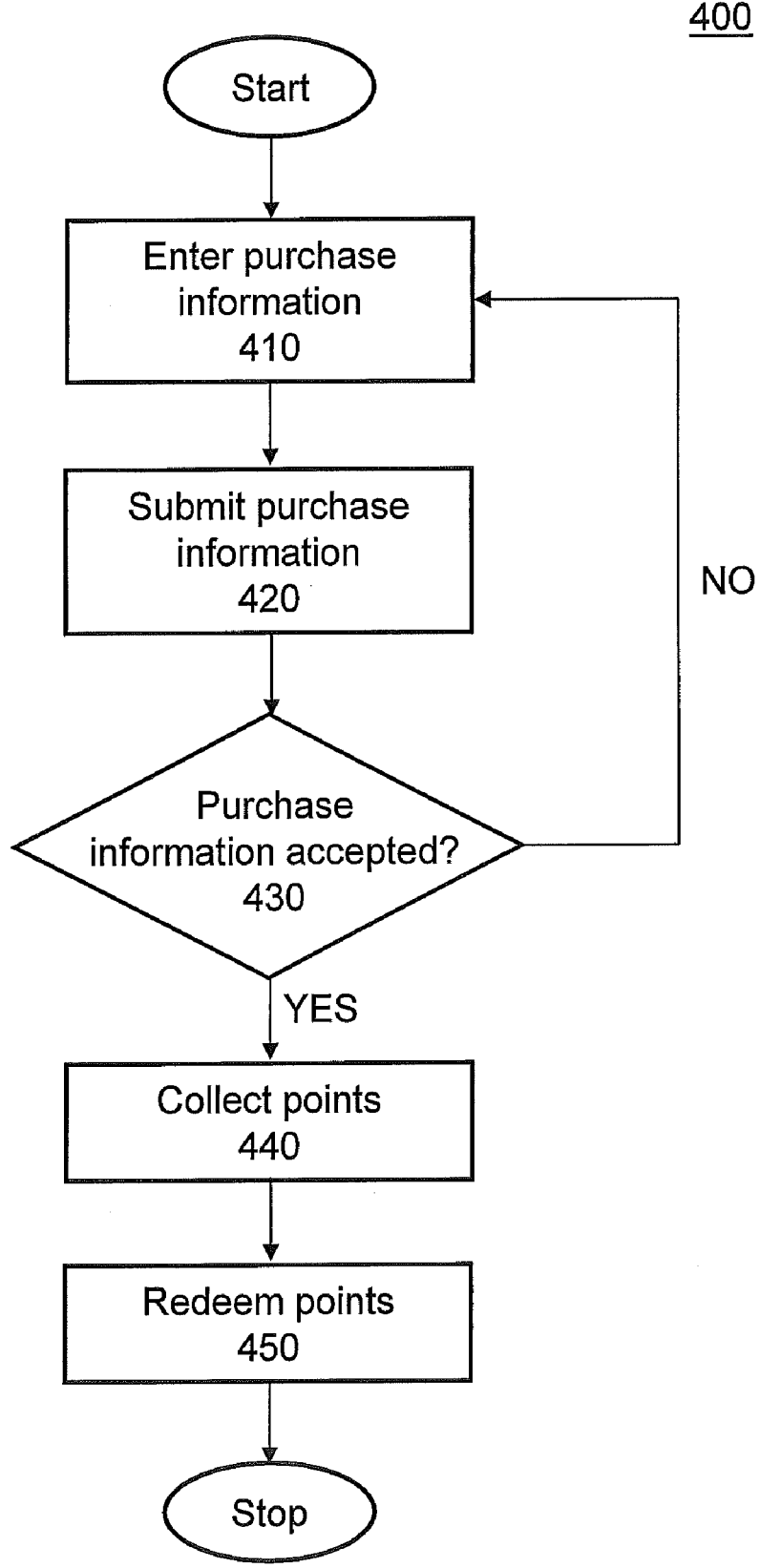
FIG. 4 illustrates a flow chart in accordance with one embodiment of the incentive program of the present invention.

An alternative embodiment of the present invention relates to an incentive or loyalty program used in conjunction with the discount retailing system. FIG. 4 illustrates a flow chart 400 in accordance with one embodiment of the incentive program of the present invention. When a sale is executed (see step 185 in FIG. 1), purchase information is entered as shown by step 410. Purchase information includes a description of the discount offer in terms of the good or service, quantity, price, and payment information. After purchase information is entered at step 410, it is submitted at step 420. After submission of the purchase information at step 420, it is determined if the purchase information is accepted at step 430. If the purchase information in not accepted at step 430, then the purchase information must be entered at step 410. Purchase information may not be accepted, for example when credit card information is invalid or the credit limit has been exceeded. If the purchase information is accepted at step 430, then points are collected at step 440. At step 450, the points are redeemed.

According to the preferred embodiment, two types of points are contemplated: "G-Points" or simply "Gs" and "Experience Points" or simply "Experiences". Gs are points collected based on the price of the consumer purchase. Experiences are points collected based on use of the discount offer after purchase. For example, if a consumer purchases a service such as a manicure from Vendor ABC and fulfills the offer by receiving the manicure, then the consumer obtains one Experience Point. According to one preferred embodiment, Gs and Experiences have different expirations and awards. Gs never expire and continue to accrue in the consumer's account while Experiences expire after a certain time period.

In one preferred embodiment, Gs are collected at a level of one point per one cent such that a consumer purchasing the discount offer for five dollars collects 500 Gs. Gs are also redeemed at a level of one point per one cent such that a consumer redeems 500 Gs to purchase a discount offer at five dollars. In one embodiment, Gs can only be redeemed at an Internet store such as a "G-store", which is a merchant or vendor that only accepts points in exchange for a good or service. FIG. 5 illustrates one embodiment of a G-store where G-Points can be redeemed. The G-store includes various goods and services for purchase using G-Points. It is contemplated the G-store may include all or a portion of previous discount offers.

In one preferred embodiment, Experiences are collected at an award level of a three-tiered ladder defined by three statuses: bronze, silver and gold. The consumer must fulfill discount offers by either receiving the service or using the good to obtain an Experience Point. Three Experience Points achieve bronze status, five Experience Points achieve silver status and thirteen Experience Points achieve gold status. Although three, five and thirteen Experiences are discussed above, any number of Experiences are contemplated. Experiences are redeemed at a level of percentage off the sale price depending on the rung of the ladder achieved. For example, the bronze status is 10% off the sale price, silver status is 15% off the sale price, and gold status is 25% off the sale price. Where G-point's can only be used toward the purchase of goods and services at the G-store, the Experience Points can be used toward the purchase of goods and services of the discount offer.

FIG. 6 illustrates a personal account summary of the incentive program in accordance with one embodiment of the present invention. As shown, all G-Points and Experience Points collected are listed. Details on the collection and redemption of the G-Points and Experience Points are provided.

An alternative embodiment of the present invention is a deal exchange or exchange program that allows customers to exchange the deals that they have already purchased for money, loyalty points or for other deals owned by other customers. The exchange provides a tool or secondary market for customers or members (or groups of members) to offer to sell or exchange their purchased deals for money or something of value.

As an example of the exchange program, if a customer has paid $25 for a deal for $50 off at a Chinese restaurant and that customer no longer plans to use that particular deal (either they do not like that restaurant, or the deal is getting ready to expire, or for any other reason), the customer can offer to sell the deal for $20. If such a sale is consummated, the individual purchasing the deal pays $20 and gets $50 off of the meal at the restaurant and the person selling the deal receives something instead of letting the deal expire.

Alternatively, the parties can exchange purchased deals so that one party receives a $50 deal at the Chinese restaurant and the other party receives a $50 deal for a massage, or a $40 deal for drinks at a bar. Anything of value, including loyalty or reward points can be exchanged.

To accommodate the purchase, sale or exchange of deals, the present invention contemplates an exchange or market where customers or members can list the deals they intend to sell (or buy), and other customers or members can make offers for the deals. The market can be open to everyone, to subscribers, or to a specified group such that only certain individuals in that specified group are allowed to offer and/or purchase deals.

As an example, a member that is about to have a manicure at Spa ABC looks to the exchange to see if there are any deals for sale for a manicure at Spa ABC. If the manicure cost $40, even if there is a deal for $30 that might have originally cost $20, the individual purchasing the deal pays less than the full amount for the manicure. As such, deals can be purchased and put up for sale on the exchange for a profit with the risk that no one will purchase the deal.

In another alternative embodiment, instead of offering the deals on the exchange for a specific amount ($30 in the example above for the manicure at Spa ABC), the potential purchasers can place the deal on the exchange and let others bid on that deal, thereby potentially obtaining the maximum amount for the deal, but still less than the full price.

The exchange can incorporate numerous limitations on the purchase or sale of the deals. For example, the basic sale would include the sales price and when the deal was set to expire. However, additional information could include when the offer for the deal (not the deal itself) was set to expire, whether the deal was still valid, and reviews or recommendations from others that had taken advantage of the deal, etc. The exchange could also allow the merchants themselves to place additional offers on the exchange. These offers and the others can be indexed to allow for quick searching of the deals.

The exchange can allow for various forms of payment or trading of deals. Besides the conventional credit card or Paypal payments, the loyalty points described herein can be accepted by the exchange and used for the transaction. Further, the exchange may determine the value of the deal based on various factors, such as original price, time for expiration, customer reviews, etc. and a one deal may have a different value than the other deal and trading may involve additional compensation, either through a credit card payment or loyalty points.

Upon payment or trade, the ownership of the deal can be immediately transferred from one party to the other, as long as each party is a registered member of the discount retailing system, the exchange, or both. The system of the present invention can record the transfer of the deal from one member to the other for validation and accounting purposes at a later date if necessary. This transfer obviates any attempt for a deal to be redeemed twice. Further, the exchange may charge a varying or set amount for the listing, or charge a commission upon the sale and transfer.

The present invention further contemplates each of the above transactions occurring on the customer's computer or mobile telephone. Applications for mobile telephone use can be created that would allow for searching, purchasing and selling the deals for ease of use. Based on the GPS functionality of various cellular telephones, deals (both from the exchange and the discount retailing system) can be forwarded to members that are located near the place where the deal can be used. With this mobile application capability, a customer can access the system (or be sent a message that there is a deal nearby), search or be informed about a deal on a mobile telephone, purchase the deal, and walk into the merchant and obtain the goods or services.

In an alternative embodiment, the present invention includes a system for matching customers to goods or services that the customer would be more interested in purchasing. For example, a deal for $25 worth of alcohol at a sports bar in the Lincoln Park area of Chicago may be more relevant to a 25 year-old male living in the city of Chicago, than to a suburban housewife with two kids that play soccer (although maybe not). The system can obtain information about customers, including their residence, age, income, education, likes, dislikes; along with information pertaining to the previous deals they purchased, whether they enjoyed or did not enjoy those deals, etc. Once that information is entered into a database, more relevant offers can be made to a particular customer with a better chance of being accepted.

There are numerous ways that this information can be obtained; some directly from the customer and some from other sources. The customer can set up a customer profile at the time membership is commenced with updates to this information happening periodically. Further, those in the customer's group (if one is set up) can provide information and information can be culled from previous deals that the customer accepted and possibly rated. Also, customer questionnaires or surveys can be used to populate the customer database.

Once information about a particular customer is known, the deals that are forwarded to that customer can be more relevant and more likely accepted.

Further, the discount retailing system may offer one deal to a customer or group of customers one day, and a different deal to a different customer or group of customers that same day.

Based on information about the customers or the group of customers, it may be more advantageous to offer a particular deal to one group of customers one day, and the same deal to a different group of customers on a different day. As such numerous deals may be offered to different or multiple groups at the same (or different) times. The retailing system can utilize historical data to determine that based on certain customer's responses to an offer, additional customers may be given the same offer. For example, if a group of customers is generated based on historical activity, and that group tends to accept offers similar to another group of customers (the second group being generated based on ratings of various deals), then if the first group accepts an offer by a certain percent (for example 10%), then the same offer should be made to the second group. The retailing system can make these determinations on the fly as deals are accepted or rejected.

There is no limitation on the number of groups or even if certain customers overlap into multiple groups (as long as they do not continue to receive the same offer multiple times). A computer program or algorithm using various filters and subroutines can keep track of the customer groups and which customers have received which offers. In this manner, a test group (or multiple test groups) can be generated and receive an offer. If the test group accepts the offer in certain quantities, the offer can be made to some or all of the other groups (or to everyone). If the test group does not respond favorably by accepting the offer in enough quantity (different from the tipping point described above), the offer may be dropped altogether.

Figure 2:
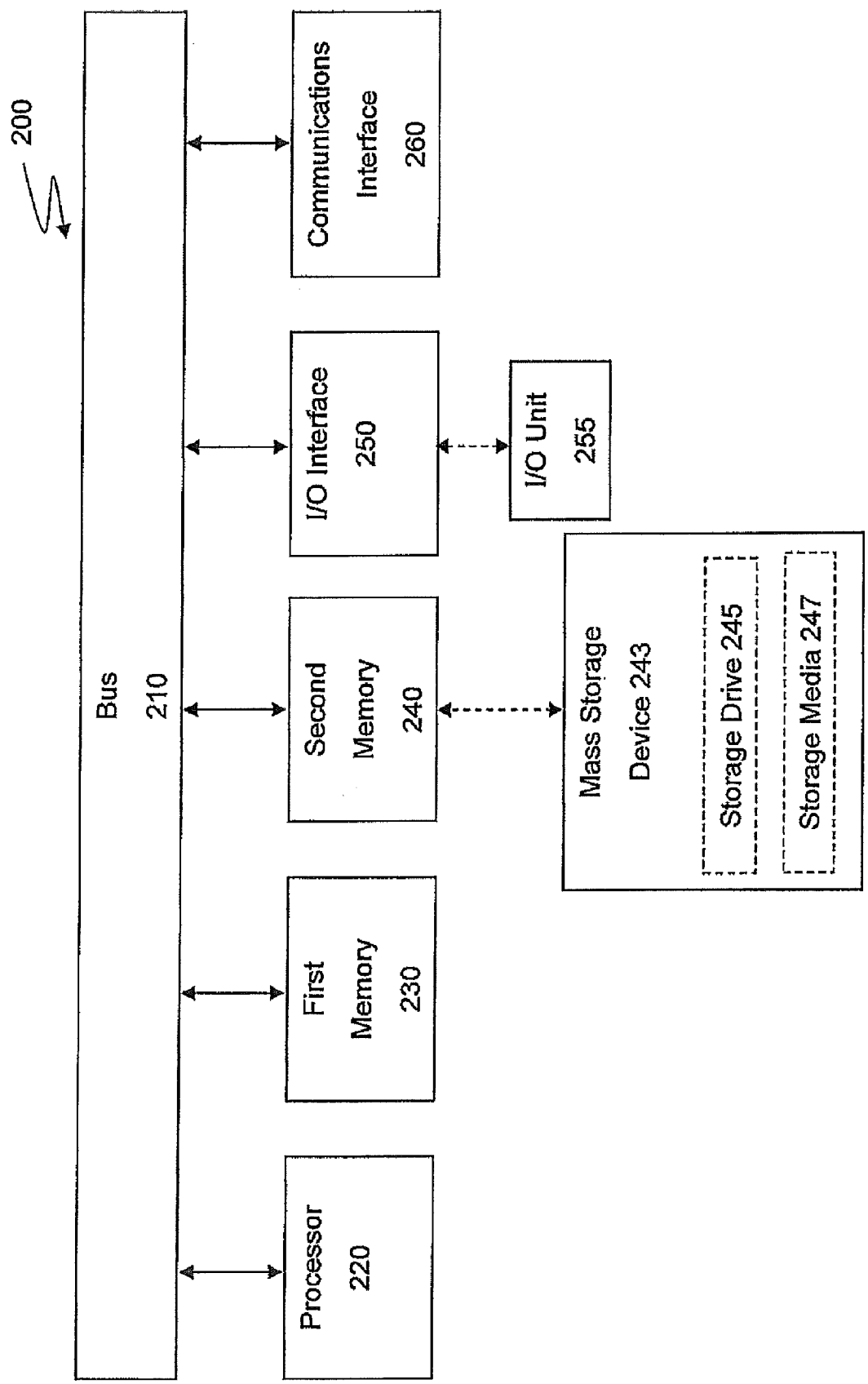
FIG. 2 illustrates an exemplary computer system according to the present invention.

FIG. 2 illustrates an exemplary computer system 200, or network architecture, that may be used to implement the methods according to the present invention. One or more computer systems 200 may carry out the methods presented herein as computer code. One or more processors, such as processor 220, which may be a special purpose or a general-purpose processor is connected to a bus 210. As shown in FIG. 2, bus 210 connects the processor 220 to various other components of the computer system 200, but it is contemplated bus 210 may connect processor 220 to components (not shown) such as, sensors, and servomechanisms. It is also contemplated that bus 210 connects the processor 220 to other computer systems. Via the bus 210, the processor 220 can receive computer code. The term "computer code" includes, for example, programs, instructions, signals and/or data. The processor 220 executes computer code and may further send the computer code via the bus 210.

Computer system 200 may include one or more memories, such as first memory 230 and second memory 240. It is contemplated that the first memory 230, secondary memory 240, or a combination thereof function as a computer usable storage medium to store and/or access computer code. The first memory 230 and second memory 240 may be, for example, random access memory (RAM), read-only memory (ROM), a mass storage device, or any combination thereof.

As shown in FIG. 2, one embodiment of second memory 240 is a mass storage device 243, although it is contemplated that first memory 230 may be the mass storage device. The mass storage device 243 comprises a storage drive 245 and a storage media 247. It is contemplated the storage media 247 may or may not be removable from the storage drive 245. Mass storage devices 243 with storage media 247 that are removable, otherwise referred to as removable storage media, allow computer code to be transferred to and/or from the computer system 200.

A mass storage device 243 may include, for example, a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device. Mass storage device 243 also includes program cartridges and cartridge interfaces (such as that found in video game devices), removable memory chips (such as an EPROM, or PROM) and associated sockets.

The computer system 200 may further or alternatively include other means for computer code to be loaded into or removed from the computer system 200, for example, input/output ("I/O") interface 250 and/or communications interface 260. Both the I/O interface 250 and the communications interface 260 allow computer code to be transferred between the computer system 200 and external devices including other computer systems. This transfer may be bi-directional or omni-direction to or from the computer system 200.

Computer code transferred by the I/O interface 250 and the communications interface 260 are typically in the form of signals, which may be electronic, electromagnetic, optical, or other signals capable of being sent and/or received by the interfaces. These signals may be transmitted via a variety of modes including, but not limited to, wire or cable, fiber optics, a phone line, a cellular phone link, infrared ("IR"), and radio frequency ("RF") link.

The I/O interface 250 may be any connection, wired or wireless, that allows the transfer of computer code. An I/O interface 250 includes, for example, an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card. In certain embodiments the I/O interface connects to an I/O unit 255 such as a user interface, monitor, speaker, printer, touch screen display, to name a few.

The communications interface 260 is also any connection that allows the transfer of computer code. Communication interfaces include, but are not limited to, a modem, network interface (such as an Ethernet card), wired or wireless systems (such as Wi-Fi, Bluetooth, and IR), local area networks, wide area networks, intranets, etc.

The invention is also directed to computer products, otherwise referred to as computer program products, to provide software that includes computer code to the computer system 200. Processor 220 executes the computer code in order to implement the methods of the present invention. As an example, the methods according to the present invention may be implemented using software that includes the computer code, wherein the software is loaded into the computer system 200 using a memory 230, 240 such as the mass storage drive 243, or through an I/O interface 250, communications interface 260, or any other interface with the computer system 200. The computer code in conjunction with the computer system 200 described herein may perform any one of, or any combination of, the steps of any of the methods presented herein. It is also contemplated that the methods according to the present invention may be performed automatically, or may be invoked by some form of manual intervention.

The computer system 200, or network architecture, of FIG. 2 is provided only for purposes of illustration, such that the present invention is not limited to this specific embodiment. It is appreciated that a person skilled in the relevant art knows how to program and implement the invention using any computer system or network architecture.

Figure 3:
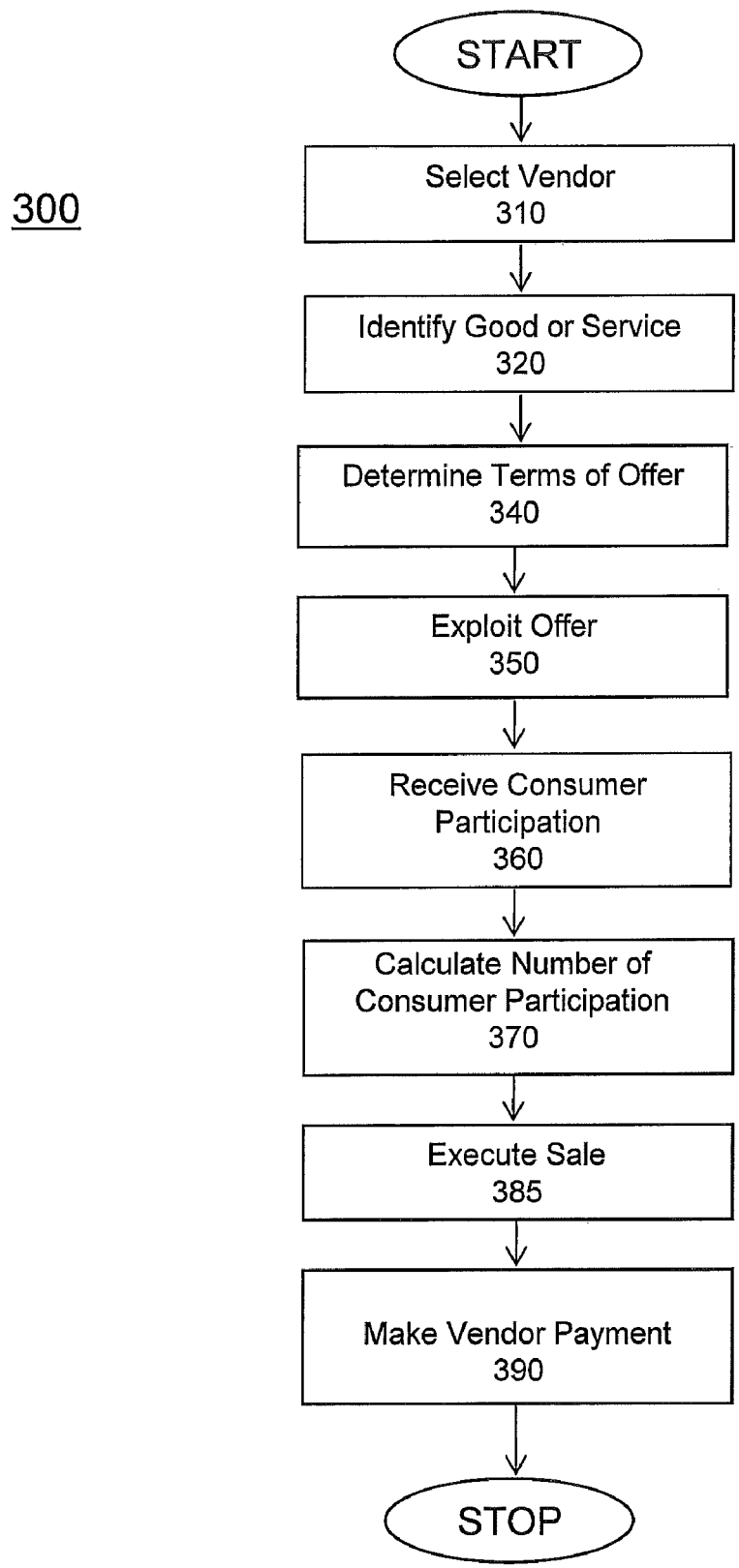
FIG. 3 illustrates a flow chart in accordance with an alternative embodiment of the present invention.

A flow chart 300 representing an alternative embodiment of the present invention is illustrated in FIG. 3. Similar to the flow chart in FIG. 1, a vendor is selected or obtained at step 310 for participation in the present invention and a good or service is identified for the process in step 320. In the alternative embodiment, no tipping point is established, however, in step 340, terms of the discount offer are determined and include the discount to be provided, duration of the offer, for example 24 hours, and an expiration date of the offer, or other restrictions associated with the offer.

At step 350 the discount offer is exploited through a website on the Internet or on some other global communication network. Consumers participate by accepting the offer such as by "signing up" for the offer on the website. "Signing up" may include providing the name of the consumer, address of the consumer, and form of payment to purchase the offer. The consumer may have already entered personal information that is stored thereby obviating the need to sign up each time to receive an offer. However, the system must be able to track the individual accepting the offer so that the consumer can be charged appropriately at the correct time, which may be when a deal reaches a tipping point (if a tipping point is used), or as soon as the consumer accepts the offer, if there is no tipping point.

At step 360, the consumer participation is received by the system and in step 370, the system calculates the number of consumers that have accepted the discount offer. This calculation can be done on a rolling basis, or at the end of the time limit, which was determined in step 340. Once the offer is accepted by the consumer and the consumer has been charged for the sale of the good or service, the consumer receives an indication that will allow him or her to receive the product or service. For example, the consumer may receive a gift certificate indicating the discount offer.

Once the number of consumers accepting the offer has been calculated and the consumers have been charged in step 385, a vendor payment can be made in step 390. The calculation and payment can occur at the end of the deal, based on a time limit, or the calculation can occur at a number of different time intervals, with numerous checks being sent to the vendor.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A method of discount retailing in which an offer does not become valid until a minimum number of offers are purchased and in which customers are allowed to collect reward points to be redeemed to purchase additional offers or other awards, comprising a network server, a microprocessor, a memory and computer software, said computer software being located in said memory and run by said microprocessor, said computer software comprising a discount retailing algorithm, wherein said discount retailing algorithm comprises the steps of:
   (a) obtaining consent from a merchant to market and advertise an item normally provided by said merchant at a standard offer price;
   (b) determining a discount offer price for said item, said discount offer price being a reduction in amount from the standard offer price of that item;
   (c) deciding on a tipping point at which time the discount offer price becomes valid;
   (d) generating an advertisement to present said discount offer price and said tipping point to potential consumers;
   (e) displaying said advertisement over a network through said network server for a predetermined period of time for potential consumers to review;
   (f) receiving acceptances of the discount offer price for the item over the network for the predetermined period of time;
   (g) determining if the tipping point has been attained;
   (h) informing each consumer that accepted the discount offer whether or not the tipping point has been attained;
   (i) providing reward points to consumers based on consumer activities; and
   (j) allowing each consumer to redeem said reward points.

2. The method of discount retailing of claim 1, wherein consumer activities include accepting a discount offer price for an item in which the tipping point has not been attained.

3. The method of discount retailing of claim 1, wherein consumer activities include accepting a discount offer price for an item in which the tipping point has been attained.

4. The method of discount retailing of claim 1, wherein consumer activities include accepting a discount offer price and redeeming that discount offer at the merchant.

5. The method of discount retailing of claim 1, wherein consumer activities include accepting multiple discount offers.

6. The method of discount retailing of claim 1, wherein consumer activities include providing remarks after accepting a discount offer and redeeming said discount offer at the merchant.

7. The method of discount retailing of claim 1, wherein consumer activities include communicating with other consumers about a discount offer.

8. The method of discount retailing of claim 1, wherein redeeming said rewards points includes using said reward points to reduce the cost of another discount offer.

9. The method of discount retailing of claim 1, wherein redeeming said rewards points includes using said reward points to purchase a good or service from a merchant that has previously provided a discount offer.

10. The method of discount retailing of claim 1, wherein redeeming said rewards points includes using said reward points to purchase a discount offer for which the time to purchase the offer has expired.

11. A method of discount retailing in which an offer does not become valid until a minimum number of offers are purchased and in which a customer is allowed to exchange, trade or sell previously purchased offers, comprising a network server, a microprocessor, a memory and computer software, said computer software being located in said memory and run by said microprocessor, said computer software comprising a discount retailing algorithm, wherein said discount retailing algorithm comprises the steps of:
   (a) obtaining consent from a merchant to market and advertise an item normally provided by said merchant at a standard offer price;
   (b) determining a discount offer price for said item, said discount offer price being a reduction in amount from the standard offer price of that item;
   (c) deciding on a tipping point at which time the discount offer price becomes valid;
   (d) generating an advertisement to present said discount offer price and said tipping point to potential consumers;
   (e) displaying said advertisement over a network through said network server for a predetermined period of time for potential consumers to review;
   (f) receiving acceptances of the discount offer price for the item over the network for the predetermined period of time;
   (g) determining if the tipping point has been attained;
   (h) informing each consumer that accepted the discount offer whether or not the tipping point has been attained;
   (i) allowing consumers to display an accepted discount offer to other consumers for purchase or trade;
   (j) providing for said consumer displaying said accepted offer for purchase or trade to communicate with said other consumer desiring to purchase or trade for said accepted offer; and
   (k) allowing said consumer to transfer ownership of said accepted discount offer to said other consumer.

12. The method of discount retailing of claim 11, wherein said displaying said accepted discount offer for purchase or trade includes a website that lists all of the accepted discount offers that consumers desire to trade or sell.

13. The method of discount retailing of claim 11, wherein said transfer of ownership from one consumer to said other consumer is checked for validity of the ownership of said accepted discount offer.

14. The method of discount retailing of claim 13, wherein a record of said transfer of ownership is retained and can be accessed at a later date for accuracy.

15. A method of discount retailing in which an offer does not become valid until a minimum number of offers are purchased and in which information about a customer is collected in order to match a customer to particular offers, comprising a network server, a microprocessor, a memory and computer software, said computer software being located in said memory and run by said microprocessor, said computer software comprising a discount retailing algorithm, wherein said discount retailing algorithm comprises the steps of:
   (a) obtaining consent from a merchant to market and advertise an item normally provided by said merchant at a standard offer price;
   (b) determining a discount offer price for said item, said discount offer price being a reduction in amount from the standard offer price of that item;
   (c) deciding on a tipping point at which time the discount offer price becomes valid;
   (d) generating an advertisement to present said discount offer price and said tipping point to potential consumers;

(e) displaying said advertisement over a network through said network server for a predetermined period of time for potential consumers to review;
(f) receiving acceptances of the discount offer price for the item over the network for the predetermined period of time;
(g) determining if the tipping point has been attained;
(h) informing each consumer that accepted the discount offer whether or not the tipping point has been attained;
(i) obtaining information about a customer; and
(j) matching said customer to a particular discount offer based on the information obtained about said customer.

16. The method of discount retailing of claim 15, wherein said information includes what the customer prefers.

17. The method of discount retailing of claim 15, wherein said information includes what the customer does not prefer.

18. The method of discount retailing of claim 15, wherein said information includes a price range for which that customer is willing to accept a discount offer.

19. The method of discount retailing of claim 15, wherein said information includes any previous discount offers that said customer preferred.

20. The method of discount retailing of claim 15, wherein said information includes any previous discount offers that said customer did not prefer.

21. The method of discount retailing of claim 15, wherein said obtaining information about a customer includes allowing said customer to create a profile.

22. The method of discount retailing of claim 15, wherein said obtaining information about a customer includes allowing said customer to answer a questionnaire or survey.

23. The method of discount retailing of claim 15, wherein said obtaining information about a customer includes obtaining information about said customer from external sources.

* * * * *